Dec. 14, 1943.  G. R. SHORT  2,336,966
MULTIPLE UNIT AIRPLANE MOTOR
Filed Oct. 11, 1939   2 Sheets-Sheet 1
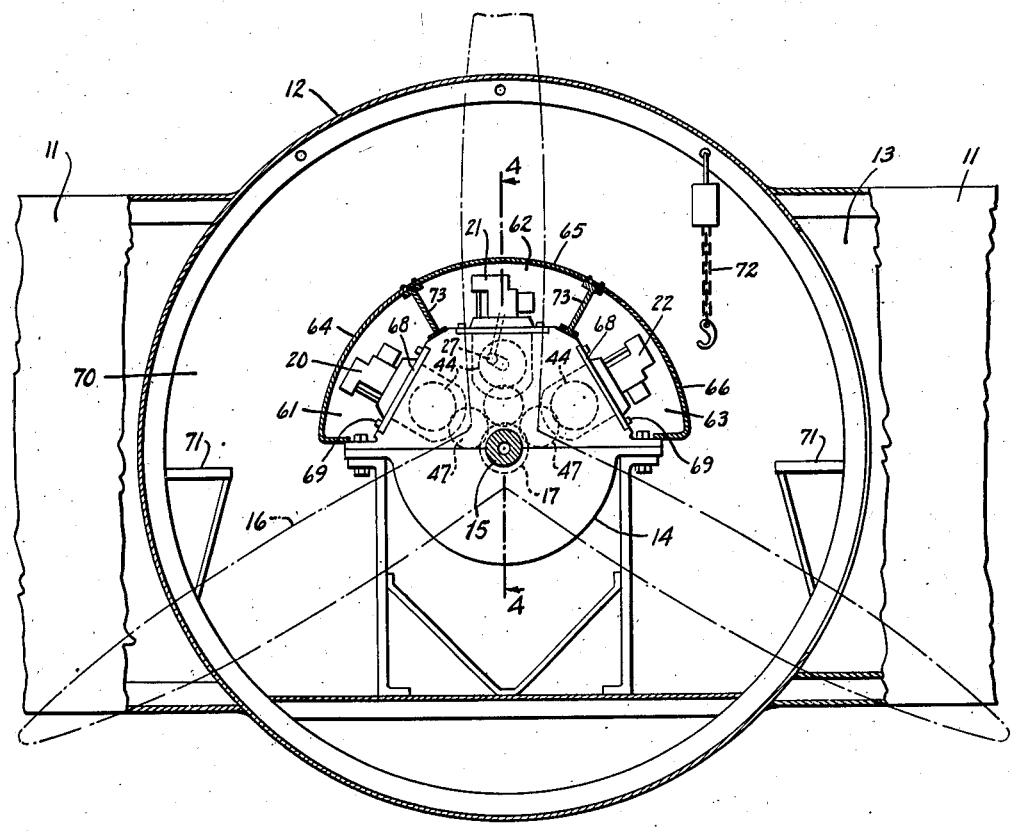
Fig. 2
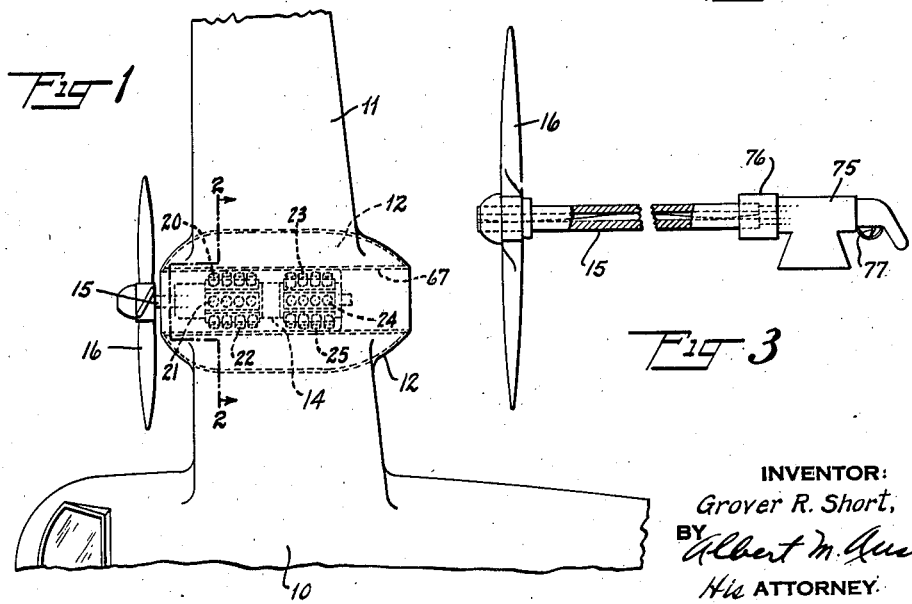
Fig. 1
Fig. 3
INVENTOR:
Grover R. Short,
BY Albert M. Austin
His ATTORNEY

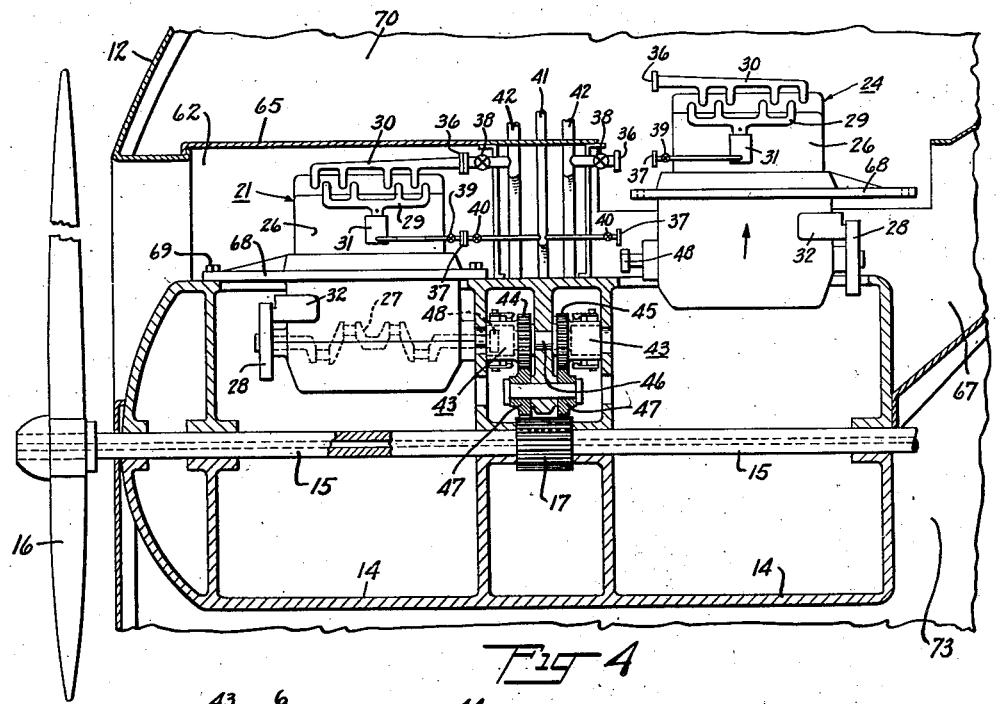
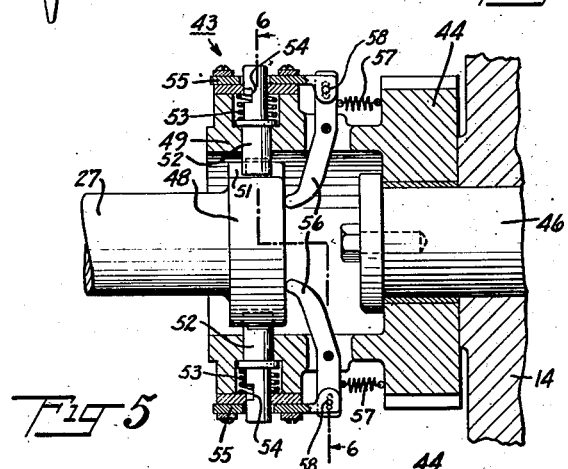
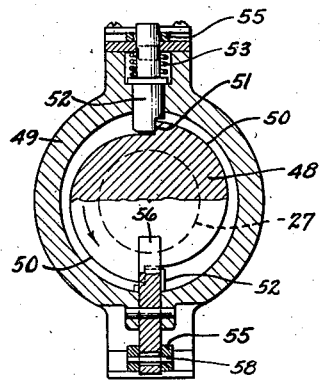
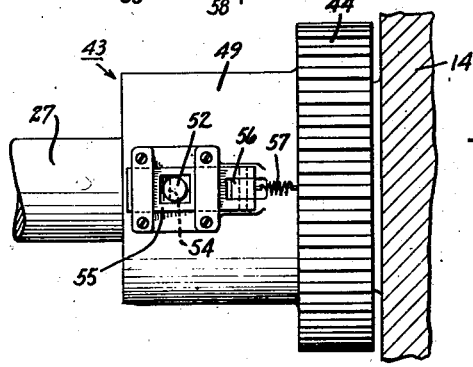

Patented Dec. 14, 1943

2,336,966

UNITED STATES PATENT OFFICE 2,336,966

MULTIPLE UNIT AIRPLANE MOTOR

Grover R. Short, Lebanon, Pa.

Application October 11, 1939, Serial No. 298,878

4 Claims. (Cl. 244—53)

The invention relates to power plants and, more particularly, to engines for driving airplanes and the like.

A prime object of the invention is to increase the safety and reliability of power plants used for driving airplanes and other aircraft.

According to the invention, a multiple unit engine is provided for driving an airplane propeller. Such an engine may comprise a series of units, each of which is a substantially complete engine in itself, these units being grouped about the propeller shaft and imparting their power thereto. Each engine unit imparts its power through a clutch or detachable connection whereby not only may a failing unit cut out without affecting the other units, but the failing unit may be bodily removed from the engine, repaired and replaced during flight.

The invention also relates to various provisions for accomplishing the desired results, including the provision of a repair room, facilities for removing the failing engine unit, special driving arrangements between the several engine units and the propeller shaft, special disconnecting devices between each unit and the propeller shaft, special cooling devices and other servicing devices required by an internal combustion engine, such as carburetors, superchargers, oiling devices, gasoline supply, exhaust service and ignition.

The grouping of the several engine units about the propeller shaft permits the shaft to be made hollow, in which case it may be associated with a machine gun or other device for shooting missiles through a propeller shaft.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a plan view of one type of airplane with which the invention may be used, showing a multiple unit engine located within a wing of the plane;

Fig. 2 is a front elevation, with parts broken away, taken on the line 2—2 of Fig. 1, showing the location of the engine and the airplane wing;

Fig. 3 is a detail showing the adaptation of a machine gun to a hollow propeller shaft;

Fig. 4 is a vertical longitudinal view taken through the engine room on the line 4—4 of Fig. 2;

Fig. 5 is a detail through an automatic overriding and disconnect clutch, used for disconnecting each unit from the engine as a whole;

Fig. 6 is a section on the line 6—6 of Fig. 5; and

Fig. 7 is a top plan view of Fig. 5.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of this invention is made for purposes of explanation, but it will be understood that the details may be modified in various respects without departure from the broad aspect of the invention.

Referring now to the drawings and more particularly to Fig. 1, the invention is shown applied to a two-propeller monoplane, each multiple unit engine being located in a wing of the plane. It will be understood that the invention may also be applied to other aircraft, such as biplanes and lighter-than-air ships, irrespective of the number of propellers used by the aircraft. The invention also applies to land and water craft.

In the form shown, 10 illustrates the body or fuselage of the plane, 11 the wing and 12 the engine room or compartment built in the wing for carrying the multiple unit engine. A catwalk, indicated by 13, extending through the wing 11 may connect the engine room 12 with the main body 10 of the plane to permit passage of mechanics to and from the engine room.

The engine room 12 contains a main framework or casing 14 having suitable bearings for the hollow propeller shaft 15 carrying three-bladed propeller 16. The propeller shaft 15 carries a main gear 17 connected to the several engine units, as explained more in detail hereinafter.

The multiple unit engine in the form shown comprises six (6) units indicated by 20 to 25 grouped around the propeller shaft 15, units 20, 21 and 22 constituting the forward bank and units 23, 24 and 25 constituting the aft bank. Any number of units may be used in each bank and each unit may be of any type of internal combustion engine and may contain any number of cylinders, four being shown for purposes of illustration. It should be borne in mind that the illustration is largely diagrammatic.

The cylinders are shown as cast en bloc for simplicity, but they may be separate. The type of engine may be radial or in line and it may be air cooled or liquid cooled. Each engine unit may be a complete engine in itself, properly balanced and capable of running alone or with the other units.

In the form shown each engine unit comprises a block 26 having a crank shaft 27, flywheel 28, the crank shaft being operated by the usual pistons and connecting rods in accordance with standard internal combustion engine construction. The intake manifold is indicated by 29, the exhaust manifold by 30, the carburetor by 31 and the electric starting motor by 32.

For permitting each unit to be completely withdrawn from operative position, detachable connections are provided for the drive shaft 27 and for the various services which the unit receives from the body of the plane. For example, detachable connections 36 and 37 are provided to exhaust pipe 42 and gasoline supply 41, respectively, hand valves 38, 39 and 40 being provided for shutting off the lines when disconnection is made. The disconnect clutch for disconnecting the crank shaft 27 is denoted by 43.

Referring now to Figs. 5–7, one disconnect clutch 43 is located between the crank shaft 27 and unit gear 44 journalled on fixed shaft 46 mounted in the framework of the engine. A corresponding unit gear 45 is also mounted on shaft 46, being driven by unit 24. It will be understood that each unit has a separate unit gear and a separate disconnect clutch, each unit gear driving an idler gear, indicated by 47 in Figs. 2 and 4, these idler gears all driving the main gear 17. Thus, each unit drives propeller shaft 15 through a separate disconnect clutch.

The disconnect clutches are all alike. Clutch 43 comprises a flange 48 on crank shaft 27 having two cam surfaces 50 and two shoulders 51. A plurality of pawls 52 are carried by a collar 49 attached to unit gear 44. The pawls 52 are pressed inwardly by springs 53 and have notches 54 adapted to be engaged by holding plates 55. Holding plates 55 are slidably mounted on collar 49 and are controlled by pivoted levers 56 having pin and slot connections 58 with plates 55. Springs 57 urge plates 55 into engagement with notches 54 when the engine unit and crank shaft 27 are removed, as will be understood from the following explanation.

The disconnect clutches or couplings also operate as overrunning clutches. When the engine unit is performing its normal driving function, shoulders 51 engage pawls 52 driving the unit gears. If, however, the engine unit slows down or stops, either by accident or by intention, the collars attached to the unit gears may overrun the collars 48 which, in effect, cuts out the particular unit from operation. The disconnect clutch operates as an overrunning clutch, the pawls 52 riding up on the cams 50 and dropping down on the shoulders 51, as will be understood by those skilled in the art.

When the crank shaft 27 (with entire engine unit) is moved axially (to the left in Fig. 5) for removing an engine unit, the fingers 56 are released and springs 57 cause the plates 55 to engage in the notches 54 when these members register. It will be understood that, when the disconnect clutch performs its ordinary overriding function with crank shaft 27 in operative position, the plates 55 are held by fingers 56 from dropping into notches 54 when they register. As the crank shaft 27 is shifted to the left in Fig. 5, before collar 48 is entirely clear of pawls 52, the fingers 56 permit plates 55 to drop into notches 54 as pawls 52 are alternately raised and dropped by cams 50 and shoulders 51.

Thus, when an engine unit is removed from position, the pawls 52 are held retracted. This is of advantage when replacing the crank shaft and unit since it permits the collar 48 to assume proper axial position with respect to the pawls 52 before engaging fingers 56 by which the plates 55 are disengaged from notches 54 and the pawls 52 released to perform their regular overriding function.

Each engine unit 21—25 has a supporting plate 68 resting in axially extending ways in framework 14 to which it is bolted by bolts 69. Thus, to remove a unit it is only necessary to unscrew the bolts 69, slide the unit axially in its ways to disengage the disconnect clutch, and then lift out the unit axially of the cylinders. The several service couplings 36, 37, etc. will be disconnected and the several valves 38, 39, 40 will, of course, first be closed before attempting to remove the engine unit. The position of an engine unit in the process of being lifted from its assembly is indicated by unit 24 in Fig. 4. It will be noted that the overrunning clutch of an ailing unit removes torque from the coupling members to facilitate axial disengagement of the coupling members when the ailing engine unit is shifted on its seat.

In the form shown, provision for air cooling is made. A series of walls 73 and removable plates 64, 65 and 66 are located around the several engine units, forming longitudinally extending air ducts 61, 62 and 63, each air duct opening out in front of the engine compartment 12 and having, if desired, shrouds or scoops for scooping up the necessary air and directing it through the air ducts 61, 62 and 63. These ducts communicate with a header duct 67 which opens aft of the engine compartment, providing a space 73 for a machine gun or for any other desired purpose. It will be understood that the plates 64, 65 and 66, indicated in Fig. 2, are complemented by similar removable plates over units 23, 24 and 25 and that each plate is separately removable for the removal and replacement of the corresponding engine unit.

The space between the shell of compartment 12 and the multiple unit engine is indicated by 70, this providing a work room from which the engines may be serviced. The work room 70 may have suitable hoisting or other handling apparatus, indicated by 72, to assist in the removal and replacing of the several engine units, work benches or other repairing machinery, being indicated by 71.

Referring now to Fig. 3, a machine gun unit is indicated by 75 having a trigger 77 for firing the gun. This machine gun unit may be of standard construction, except that the hollow propeller shaft 15 may be used as the barrel of the gun. A suitable gland, indicated by 76, connects the stationary gun unit 75 with the rotating gun barrel 15 in such way as to prevent loss of gas pressure created by the exploding cartridge. The interior of the hollow shaft 15 may or may not be rifled. Suitable cooling devices, such as oil or air, may be provided for keeping the gun barrel 15 cool.

In case of engine trouble, after the faulty unit is located, it is removed as follows while the plane is in flight:

The cover plate, such as 64, 65 or 66, for the particular engine unit is first removed and then the servicing connections to the engine, such as 36 and 37, and the holding down bolts 69 are removed; then the entire unit is lifted out of the engine assembly in the manner above described. The unit is conveniently handled by the handling apparatus 72 and is examined in the work room 70 to ascertain its trouble. If the faulty unit can be repaired, this is done and the engine unit is replaced in position, or a spare unit might be substituted or, if no spare units are available and it is inconvenient or impossible to repair the damaged unit, the air duct cover plate may be replaced and the multiple unit engine run with the faulty unit out of position. When an engine unit is replaced, its starting motor 32 may be used for cranking it since the overriding clutches prevent any torque being obtained from the other units.

Many advantages of this system will be apparent to those skilled in the art. By using a large number of comparatively small engine units, more horsepower can be assembled into a single multiple unit engine. Furthermore, increased safety is obtained since any unit may cut out without affecting the driving power of the other units, it being understood that each unit is a statically and dynamically balanced internal combustion engine within itself. Furthermore, increased reliability is obtained, reducing forced landings due to engine trouble. If a sufficient number of units are used, the loss of power from one unit is not so serious since the remaining units are available for driving the propeller. The ability to completely remove the unit from its driving position permits the defects often to be remedied while in flight, thus restoring complete power with its corresponding security.

It will be understood that the drawings are largely diagrammatic and are shown for purposes of illustrating a completely new system rather than any particular construction. The details will naturally depend upon the particular airplane design and the type of engine used. Internal combustion engines as commonly used require various services, as for example, gasoline supply, carburetor, supercharger, exhaust, lubrication and ignition. These various services may be located as much as possible on each particular unit so that each unit is complete in itself. In the form shown, each unit has its own carburetor, starting motor, lubricating pump and ignition, and it is only necessary to supply fuel and exhaust services. However, if desired, the various services may be centrally located, being connected by pipes and wires to the various units as illustrated by the fuel and exhaust services in the form described. Instead of using separate pipes for supplying the services, channels may be cut in the structural parts of the main framework and in the blocks of the engine units and instead of providing manual detachable connections and manual control valves for these services, the connections may be automatically detachable by simply removing the unit from its assembly and the valves may be closed automatically by such removal.

While certain novel features of the invention have been disclosed and are pointed out in the annexed claims, it will be understood that various omissions, substitutions and changes may be made by those skilled in the art without departing from the spirit of the invention.

What is claimed is:

1. In an aircraft, an engine station comprising an outer shell, a framework within said shell, a propeller shaft journalled in said framework, a series of forward engine units and a series of aft engine units, each series being circumferentially distributed about said propeller shaft and having driving relation therewith, a plurality of air ducts extending parallel to said propeller shaft and having walls between said units, said ducts opening forward to receive air and opening aft to discharge air, said ducts having separately removable plates to permit removal of said units from operative position, the space between said ducts and said shell providing a repair room in which the removed engine units may be repaired.

2. In an aircraft, an aircraft body, a multiple unit engine base on said body, a propeller for driving the aircraft, a plurality of output coupling members, means transmitting power from said output coupling members to said propeller, a series of removable engine units whose drive shafts have input coupling members aligned with corresponding output coupling members, said engine base having a plurality of seats for the respective engine units, each seat providing a way extending parallel to its engine unit drive shaft, each engine unit being seated on its respective way and being slidable on said way parallel to its drive shaft, corresponding input and output coupling members having abutting torque-transmitting members, said coupling members being so positioned that each said input coupling member disengages its corresponding output coupling member when its engine unit is slid on its way away from its output coupling member, over-running clutch devices associated with corresponding input and output coupling members to prevent torque from being transmitted through said coupling members when their engine unit slows down, whereby any ailing engine unit may stop without interfering with the other engine units and whereby, after said torque is removed, the ailing engines unit may be shifted on its way parallel to its drive shaft to withdraw its input coupling member from the corresponding output coupling member after which the ailing engine unit may be lifted bodily from its seat.

3. In an aircraft, an aircraft body, a multiple unit engine base on said body, a propeller for driving the aircraft, a plurality of output coupling members, means transmitting power from said output coupling members to said propeller shaft, a series of removable engine units whose drive shafts have input coupling members aligned with corresponding output coupling members, said engine base having a plurality of seats for the respective engine units, each seat providing a way extending parallel to its engine unit drive shaft, each engine unit being seated on its respective way and being slidable on said way parallel to its drive shaft, each said output coupling member comprising a sleeve, a plurality of spring pressed pawls carried by said sleeve, each said input coupling member having ratchet teeth engaging said pawls, internal fingers carried by said sleeve engaging an abutment on the corresponding engine shaft and having means for holding said pawls in retracted position when said input coupling member is axially withdrawn from the corresponding output coupling member, said input and output coupling members constituting overrunning and detachable connections for the several engine units, whereby any ailing engine unit may stop without interfering with the other engine units and whereby the ailing engine unit may be shifted on its way parallel to its drive shaft to withdraw its input coupling member from the corresponding output coupling member after which the ailing engine unit may be lifted bodily from its seat.

4. In an aircraft, an aircraft body, a multiple unit engine base on said body, a propeller for driving the aircraft, a plurality of output coupling members, means transmitting power from said output coupling members to said propeller, a series of removable engine units whose drive shafts have input coupling members aligned with corresponding output coupling members, said engine base having a plurality of seats for the respective engine units, each seat providing a way extending parallel to its engine unit drive shaft, each engine unit being seated on its respective way and being slidable on said way parallel to its drive shaft, corresponding input and output coupling members having abutting torque-transmitting members, said coupling members being so positioned that each said input coupling member disengages its corresponding output coupling member when its engine unit is slid on its way away from its output coupling member, overrunning clutch devices associated with each engine unit to remove torque from its corresponding input and output coupling member when its engine unit slows down, whereby any ailing engine unit may stop without interfering with the other engine units and whereby, after said torque is removed, the ailing engine unit may be shifted on its way parallel to its drive shaft to withdraw its input coupling member from the corresponding output coupling member after which the ailing engine unit may be lifted bodily from its seat.

GROVER R. SHORT.